US011822924B2

(12) United States Patent
Otenko

(10) Patent No.: US 11,822,924 B2
(45) Date of Patent: Nov. 21, 2023

(54) SYSTEM AND METHOD FOR REACTIVE FLATTENING MAP FOR USE WITH A MICROSERVICES OR OTHER COMPUTING ENVIRONMENT

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 106 days.

(21) Appl. No.: 17/410,729

(22) Filed: Aug. 24, 2021

(65) Prior Publication Data

US 2022/0075623 A1 Mar. 10, 2022

Related U.S. Application Data

(60) Provisional application No. 63/074,886, filed on Sep. 4, 2020.

(51) Int. Cl.
| | |
|---|---|
| *G06F 9/48* | (2006.01) |
| *G06F 9/54* | (2006.01) |
| *G06F 9/38* | (2018.01) |
| *G06F 9/30* | (2018.01) |
| *G06F 9/50* | (2006.01) |

(52) U.S. Cl.
CPC ........ *G06F 9/3836* (2013.01); *G06F 9/30087* (2013.01); *G06F 9/4881* (2013.01); *G06F 9/5072* (2013.01); *G06F 9/542* (2013.01); *G06F 9/546* (2013.01)

(58) Field of Classification Search
CPC ...... G06F 9/4881; G06F 9/5072; G06F 9/542; G06F 9/546
See application file for complete search history.

(56) References Cited

U.S. PATENT DOCUMENTS

| | | |
|---|---|---|
| 10,904,074 B2 | 1/2021 | Wilson |
| 11,108,758 B2 | 8/2021 | Hale |
| 2011/0138403 A1 | 6/2011 | Meijer |

(Continued)

OTHER PUBLICATIONS

European Patent Office, International Searching Authority, International Search Report and Written Opinion dated Jan. 4, 2022 for International Application No. PCT/US2021/048734, 17 pages.

(Continued)

*Primary Examiner* — Jacob Petranek
(74) *Attorney, Agent, or Firm* — TUCKER ELLIS LLP

(57) ABSTRACT

In accordance with an embodiment, described herein is a system and method for providing a reactive flattening map for use with a microservices or other computing environment. In a cloud computing environment, reactive programming can be used with publishers and subscribers, to abstract execution away from the thread of execution while providing rigorous coordination of various state transitions. The described approach provides support for processing streams of data involving one or more publishers and subscribers, by use of a multi-flat-map publisher component, to flatten or otherwise combine events emitted by multiple publishers concurrently, into a single stream of events for use by a downstream subscriber.

17 Claims, 14 Drawing Sheets

(56) References Cited

U.S. PATENT DOCUMENTS

| | | | | |
|---|---|---|---|---|
| 2013/0198489 | A1* | 8/2013 | Branson | G06F 9/44 |
| | | | | 712/200 |
| 2018/0083826 | A1 | 3/2018 | Wilson | |
| 2019/0379650 | A1 | 12/2019 | Hale | |
| 2020/0125376 | A1* | 4/2020 | Kashyap | G06F 9/543 |
| 2021/0389998 | A1* | 12/2021 | Gupta | G06F 9/4881 |

OTHER PUBLICATIONS

Apple Inc., "Publishers.FlatMap", Jun. 18, 2019, 11 pages.
Douglas Surber et al., Oracle "ADBA-Asynchronous Database Access A Reactive, non-blocking API for Connecting to an RDBMS" Copyright @ 2018, Database Server Technologies Mar. 2019, 39 pages.
Ozenero, Java 9 Flow API—Reactive Streams—ozenero, retrieved on Oct. 5, 2021, 3 pages, retrieved from <https://ozenero.com/java-9-flow-api-reactive-streams>.
Ozenero, Java 9 Flow API example—Processor—ozenero, retrieved on Oct. 5, 2021, 8 pages, retrieved from <https://ozenero.com/java-9-flow-api-example-processor>.
Ozenero, Java 9 Flow API example Publisher and Subscriber—ozenero, retrieved on Oct. 5, 2021, 4 pages, retrieved from <https://ozenero.com/java-9-flow-api-example-publisher-and-subscriber>.
Ozenero, Java 9 FLow SubmissionPublisher—A Concrete Publisher—ozenero, retrieved Oct. 5, 2021, 6 pages, retrieved from <https://ozenero.com/java-9-flow-submissionpublisher-concrete-publisher>.
Java Developer Zone, "Java 9 Reactive Programming with Flow API" retrieved on Oct. 5, 2021, 3 pages, retrieved from <https://javadeveloperzone.com/java-9/java-9-reactive-programming-flow>.
United States Patent and Trademark Office, Office Communication dated Mar. 16, 2023 for U.S. Appl. No. 17/410,733, 9 pages.
Karnok, David; "Helidon—MultiFlatMapPublisher.java", Apr. 2020; retrieved from: <https://github.com/helidon-io/helidon/tree/main/common/reactive/src/main> on Sep. 3, 2020; 9 pages.
Karnok, David; "Advanced Reactive Java—FlatMap (part 1)", Feb. 24, 2016; retrieved from: <https://akarnokd.blogspot.com/2016/02/flatmap-part-1.html> on Jun. 23, 2023; 8 pages.
Karnok, David; "Advanced Reactive Java—FlatMap (part 2)", Mar. 2, 2016; retrieved from: <https://akarnokd.blogspot.com/2016/03/flatmap-part-2.html> on Jun. 23, 2023; 11 pages.
Kamnok, David; "Advanced Reactive Java—Comparison of Reactive-Streams implementations (part 1)"; Oct. 28, 2015; retrieved from: <https://akarnokd.blogspot.com/2015/10/comparison-of-reactive-streams.html> on Jun. 23, 2023; 8 pages.
Hald, Ulrik Bech; "Using flatMap() to Parallelize Streams and Delay Individual Errors", Mar. 23, 2017; retrieved from: <https://medium.com/tech-at-unwire/parallize-streams-using-flatmap-and-delay-any-errors-5f194a56009a> on Jun. 23, 2023; 8 pages.

* cited by examiner

SYSTEM AND METHOD FOR REACTIVE FLATTENING MAP FOR USE WITH A MICROSERVICES OR OTHER COMPUTING ENVIRONMENT

CLAIM OF PRIORITY

This application claims the benefit of priority to U.S. Provisional patent application titled "SYSTEM AND METHOD FOR REACTIVE FLATTENING MAP FOR USE WITH A MICROSERVICES OR OTHER COMPUTING ENVIRONMENT", Application No. 63/074,886, filed Sep. 4, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing, software development, and microservice architectures, and are particularly directed to providing a reactive flattening map for use with a microservices or other computing environment.

BACKGROUND

Microservice environments can present a software application as a collection of loosely-coupled services that are independently deployable and communicate with one another over a network. The microservice approach can be used, for example, to develop software applications to be provided in cloud computing environments as cloud services. In such environments, microservices can be used to provide elasticity, and to make efficient use of computational resources.

SUMMARY

In accordance with an embodiment, described herein is a system and method for providing a reactive flattening map for use with a microservices or other computing environment. In a cloud computing environment, reactive programming can be used with publishers and subscribers, to abstract execution away from the thread of execution while providing rigorous coordination of various state transitions. The described approach provides support for processing streams of data involving one or more publishers and subscribers, by use of a multi-flat-map publisher component, to flatten or otherwise combine events emitted by multiple publishers concurrently, into a single stream of events for use by a downstream subscriber.

DETAILED DESCRIPTION

As described above, microservice architectures can present a software application as a collection of loosely-coupled services that are independently deployable and communicate with one another over a network. The microservice approach can be used, for example, to develop software applications to be provided in cloud computing environments as cloud services. In such environments, microservices can be used to provide elasticity, and to make efficient use of computational resources.

Software development frameworks such as Helidon assist in the development of microservices. For example, Helidon offers Standard Edition (SE) and MicroProfile (MP) programming models or environments, each of which include a collection of software libraries that support features such as configuration, security, or web server functionality; and provide a software developer with a foundation upon which to create a microservice.

Generally described, Helidon alleviates the need for the software developer to program according to a specific tooling or deployment model, and enables the running of microservices without the need for an application server. Helidon libraries can interoperate with other software development, deployment, and/or monitoring tools such as, for example, Docker, Kubernetes, Prometheus, or OpenTracing.

Microservices Environments (Helidon)

Figure 1:
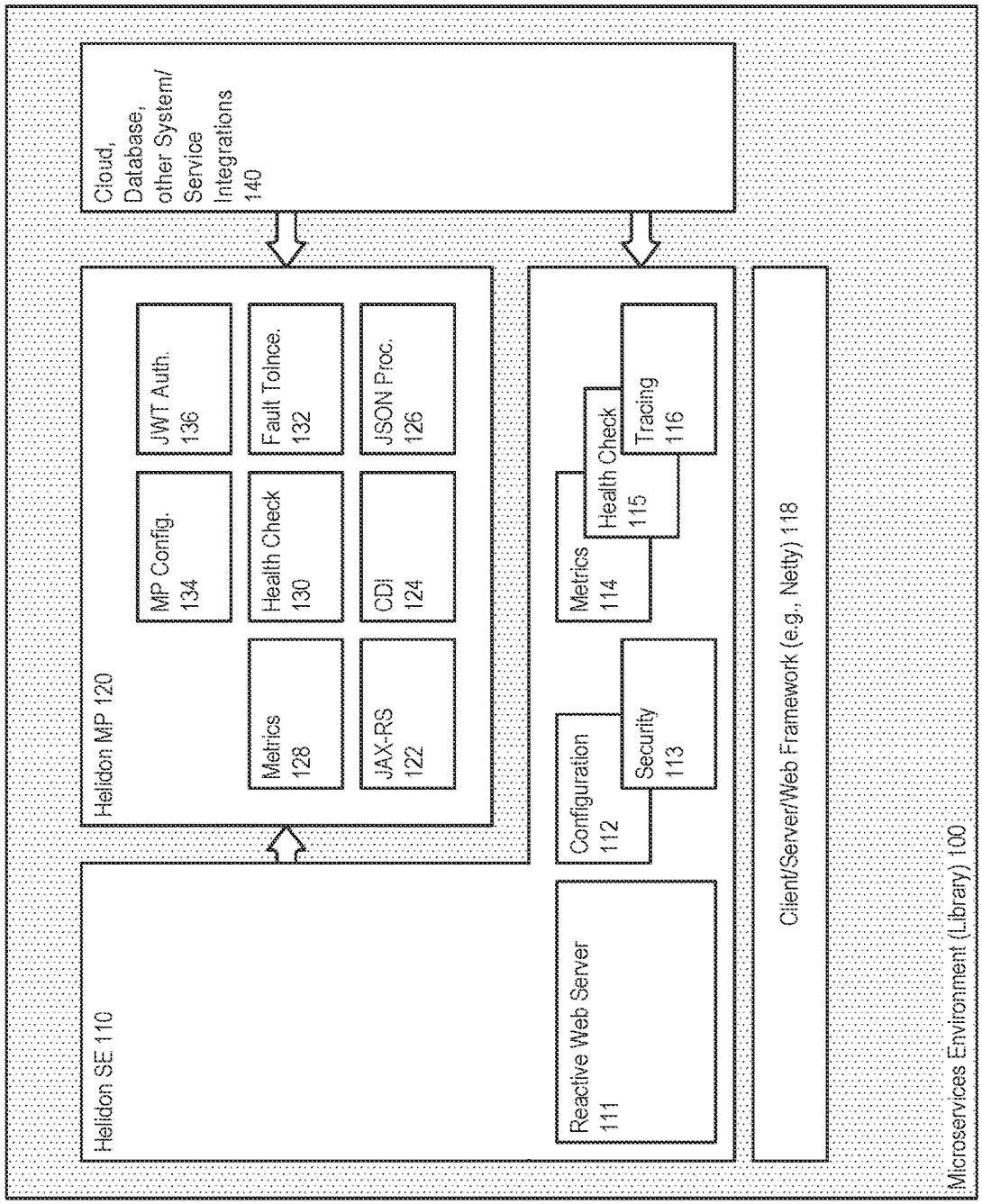
FIG. 1 illustrates an example microservices environment that provides a software development framework, in accordance with an embodiment.

FIG. 1 illustrates an example microservices environment that provides a software development framework, in accordance with an embodiment.

As illustrated in FIG. 1, in accordance with an embodiment, a Helidon microservices environment 100 offers both Standard Edition (SE) and MicroProfile (MP) programming models or environments.

In accordance with an embodiment, a Helidon SE environment 110 can include various libraries, APIs, or other components, such as, for example, a reactive web server 111, which provides an asynchronous and reactive API for creating web applications; a configuration API 112, which provides a Java API to load and process configuration properties in key/value form into a config object which an application can then use to retrieve config data; and a security component 113, which provides authentication, authorization, and outbound security; and can also include metrics 114, health check 115, and tracing 116 or other components.

In accordance with an embodiment, a Helidon MP environment 120 can include various libraries, APIs, or other components, such as, for example, JAX-RS 122, JSON-P 126, CDI 124, metrics 128, health check 130 fault tolerance 132, MicroProfile configuration 134, and JWT authentication 136 components. In accordance with an embodiment, the web server can be provided by a non-blocking client/server/web framework 118, such as, for example, Netty. The microservices environment can also enable interactions with cloud, database, or other systems or services 140.

Figure 2:
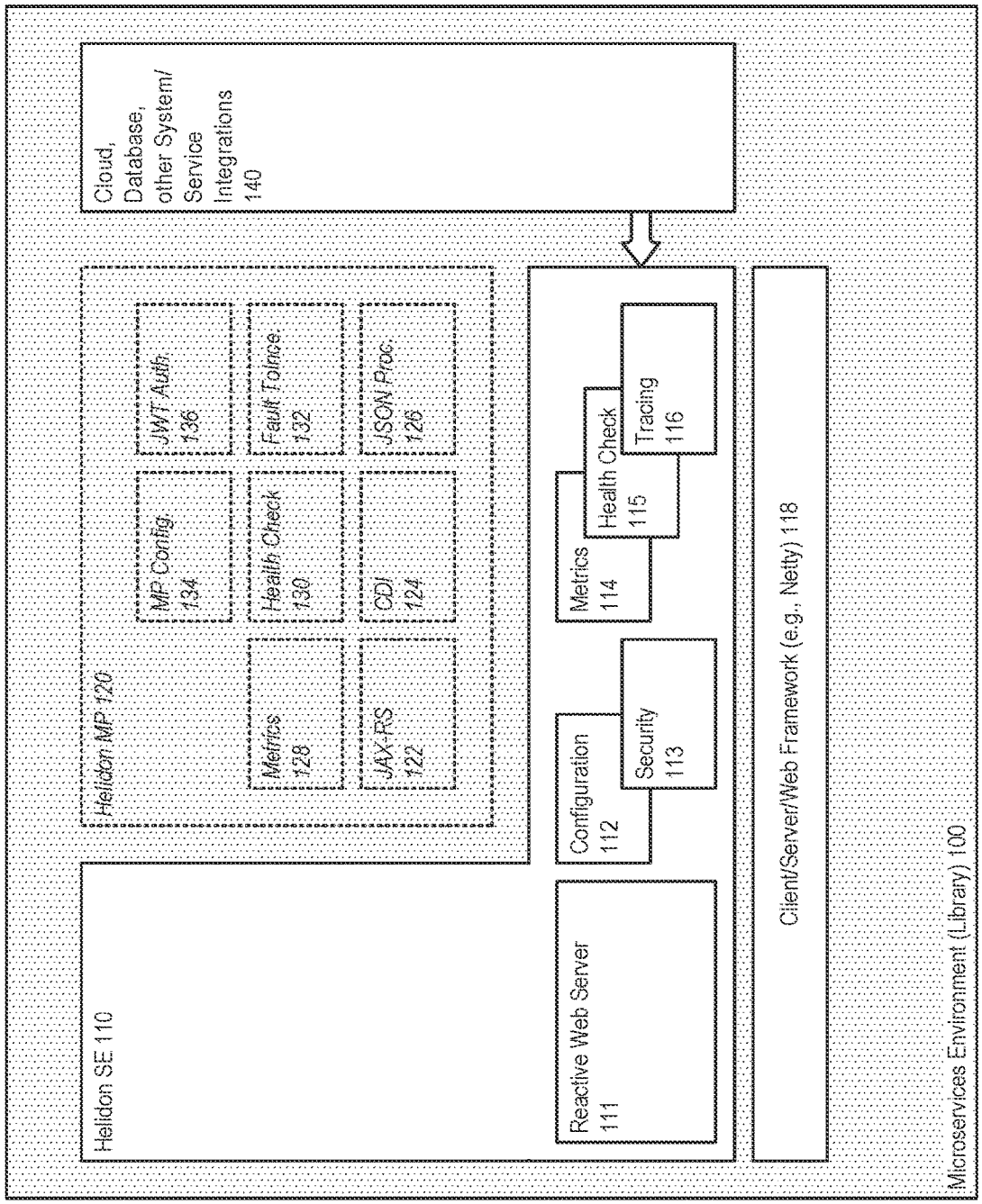
FIG. 2 illustrates an example Helidon SE microservices environment, in accordance with an embodiment.

FIG. 2 illustrates an example Helidon SE microservices environment, in accordance with an embodiment.

As illustrated in FIG. 2, in accordance with an embodiment, a Helidon SE environment supports a functional programming style that uses the web server, security and configuration components directly; provides the software developer with transparency and control; and supports Java features such as reactive streams, and asynchronous and functional programming. A Helidon SE environment provides a framework by which the software developer can build lightweight reactive microservices.

Figure 3:
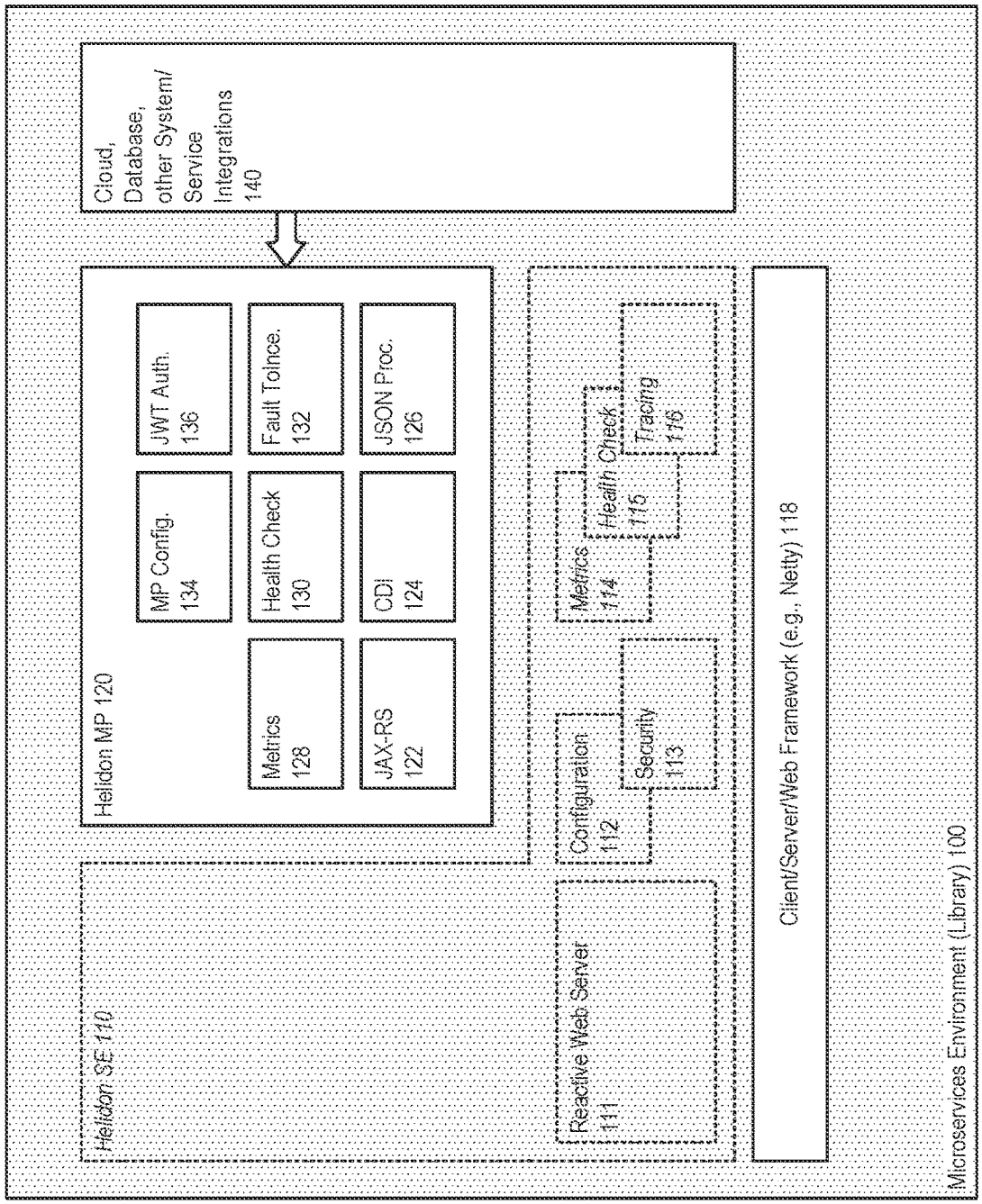
FIG. 3 illustrates an example Helidon MP microservices environment, in accordance with an embodiment.

FIG. 3 illustrates an example Helidon MP microservices environment, in accordance with an embodiment.

As illustrated in FIG. 3, in accordance with an embodiment, a Helidon MP environment supports a declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

In accordance with an embodiment, a microservices environment can present a software application as a collection of loosely-coupled services that are independently deployable and communicate with one another over a network. For example, a Helidon microservices environment can support the use of a remote procedure call (e.g., gRPC) framework or component, which enables (client and/or server) applications to communicate within the microservices environment, to build connected systems.

Figure 4:
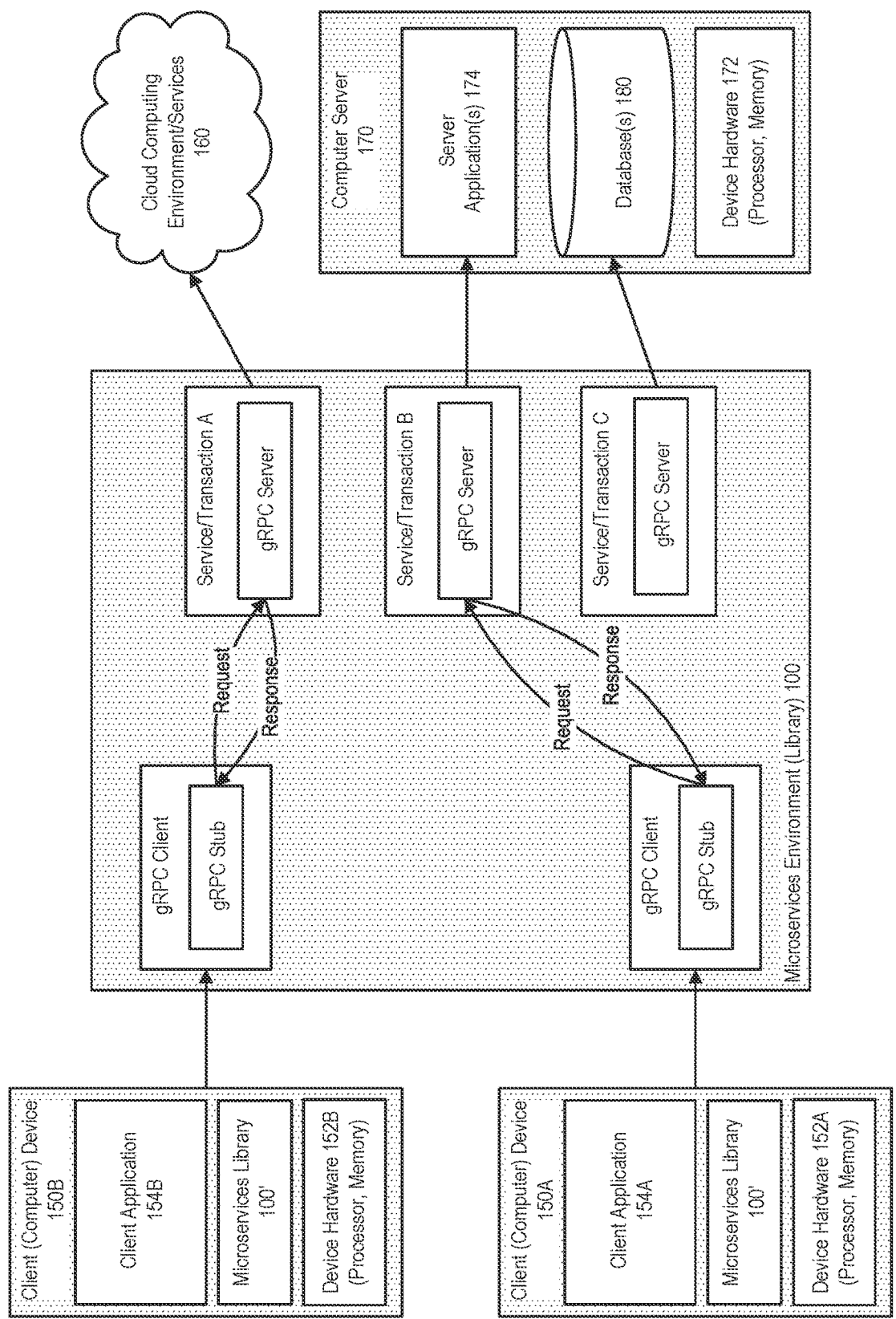
FIG. 4 illustrates communication in a microservices environment, in accordance with an embodiment.

FIG. 4 illustrates communication in a microservices environment, in accordance with an embodiment.

The example shown and described in FIG. 4 is provided for purposes of illustrating an example of one type of communication supported by a microservices environment; in accordance with other embodiments and examples, other types of communication can be supported.

As illustrated in FIG. 4, in accordance with an embodiment, a remote procedure call framework enables definition of a service and methods that can be called remotely. A server or service can handle calls from a client, via a local object (stub) at the client that enables a client application to directly call a method on a server application as if it were a local object. The server/service implements methods to handle client calls, including decoding incoming requests, executing service methods, and encoding service responses. The local object (stub) implements the same methods as the service, wrapping the parameters for the call in an appropriate protocol buffer message type, which is then provided as requests to the server.

In accordance with an embodiment, a microservices library enables access by client applications to communicate with microservices or interact with cloud, database, or other systems or services, for purposes of accessing data, processing transactions, or performing other operations associated with those systems or services.

Reactive Environments

In a traditional message-driven environment, a producer sends messages to a consumer as they become available; however if the consumer is not able to process the messages in real time then the received messages are stored in a buffer, which can lead to performance issues.

In accordance with an embodiment, a microservices environment can provide a reactive environment, for example a reactive engine or reactive messaging API, for use with activities such as transaction processing, asynchronous messaging channels, or reactive streams.

Figure 5:
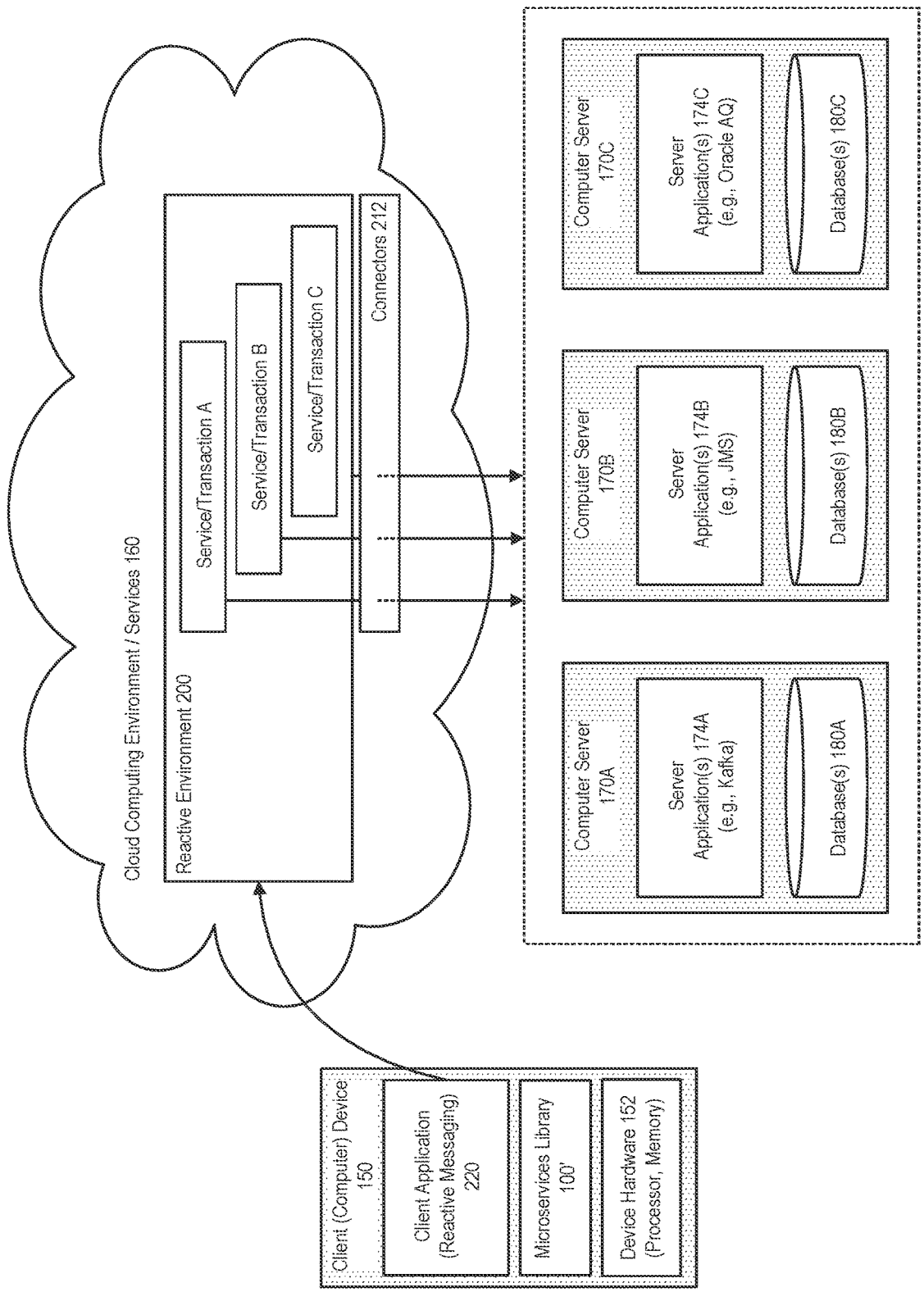
FIG. 5 illustrates the use of a reactive environment in a microservices environment, in accordance with an embodiment.

FIG. 5 illustrates the use of a reactive environment in a microservices environment, in accordance with an embodiment.

The example shown and described in FIG. 5 is provided for purposes of illustrating an example of one type or usage of a reactive environment as supported by a microservices environment; in accordance with other embodiments and examples, other types and usages of reactive environments can be provided.

As illustrated in FIG. 5, in accordance with an embodiment, the reactive environment 200 enables a client application 220 to communicate reactively with services, as publishers and subscribers, within the microservices environment. Connectors 212 can be used to provide publishers and subscribers with access to reactive messaging channels, or to provide support for the use of reactive messaging with Kafka, JMS, or other type of messaging, message queueing, or stream processing environments.

In accordance with an embodiment, the reactive environment enables asynchronous stream processing with non-blocking back pressure—a subscriber informs a publisher as to how much data it can process, and the publisher sends an appropriate amount of data as requested by the subscriber.

Figure 6:
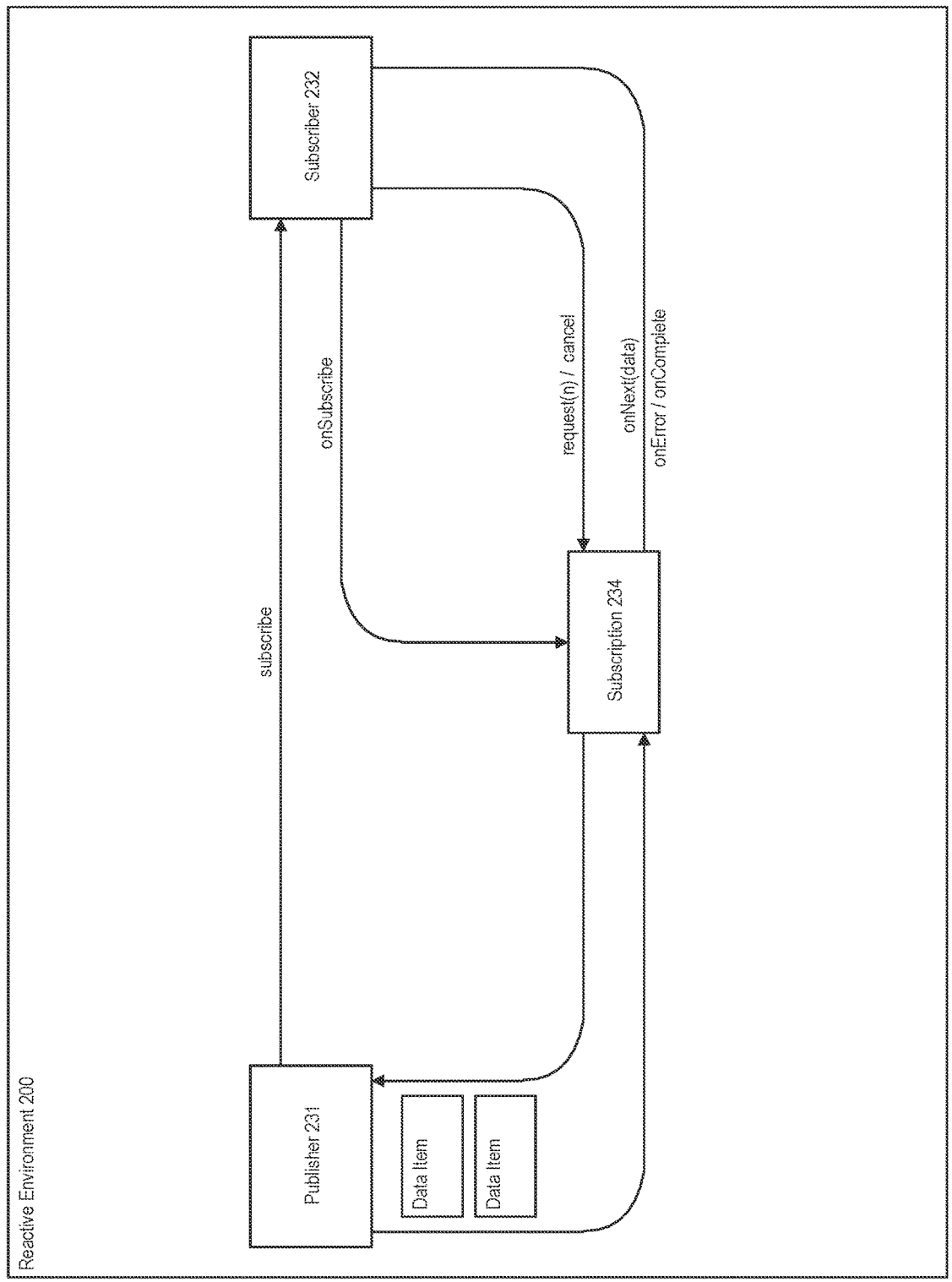
FIG. 6 further illustrates the use of a reactive environment, in accordance with an embodiment.

FIG. 6 further illustrates the use of a reactive environment, in accordance with an embodiment.

As illustrated in FIG. 6, in accordance with an embodiment, a publisher 231 (referred to herein in some examples as a Publisher) operates as a producer of data, according to the demand requested by its subscribers. A subscriber 232 (referred to herein in some examples as a Subscriber) operates as a consumer of the data produced by a publisher. A subscription (referred to herein in some examples as a Subscription) 234 defines the relationship between a subscriber subscribing to a publisher, and provides a mechanism by which the subscriber can request more data (from the publisher).

Figure 7:
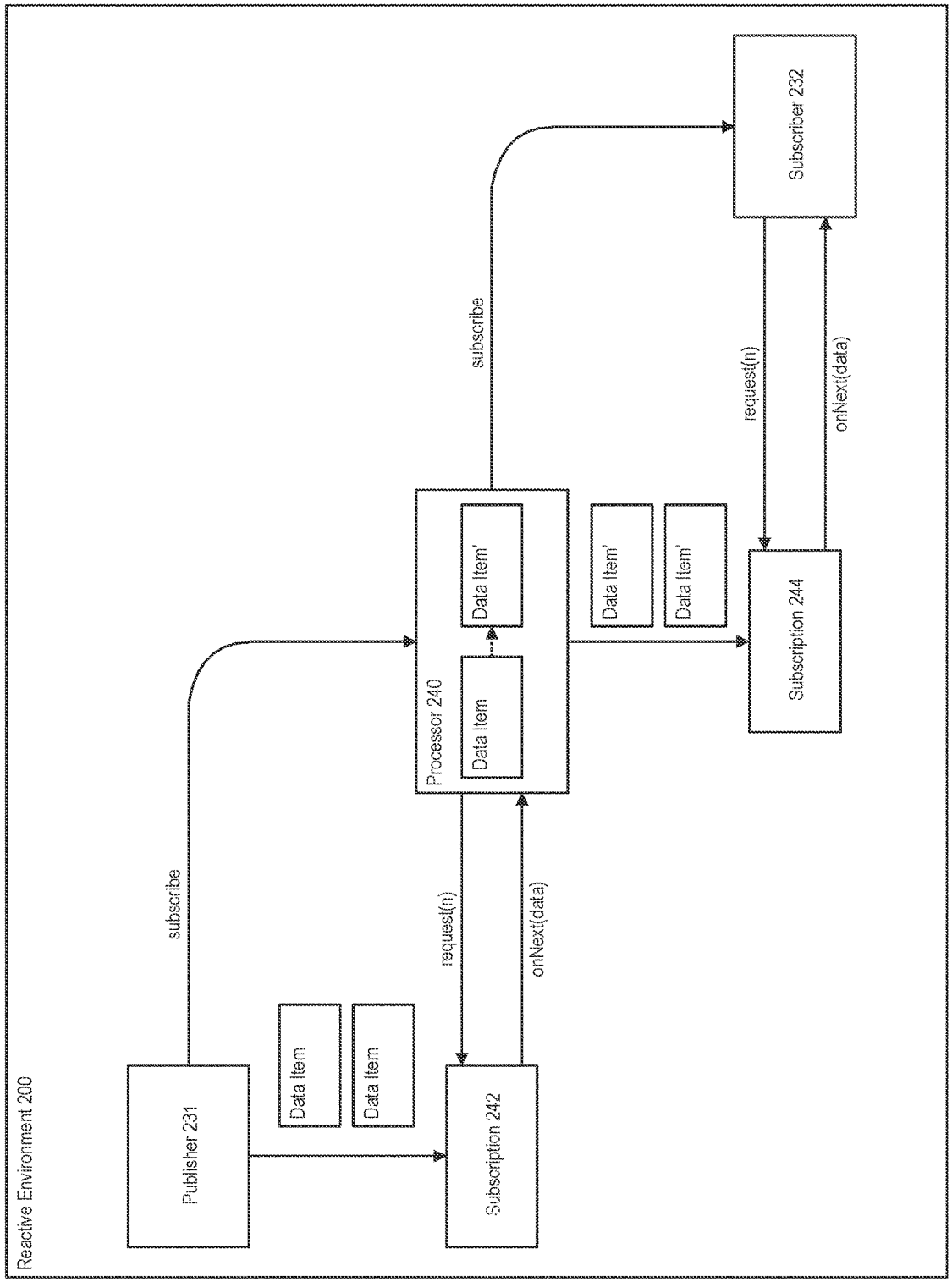
FIG. 7 further illustrates the use of a reactive environment, in accordance with an embodiment.

FIG. 7 further illustrates the use of a reactive environment, in accordance with an embodiment.

As illustrated in FIG. 7, in accordance with an embodiment, a processor 240 (referred to herein in some examples as a Processor) operates as a message/data processing stage, and (via subscriptions 242, 244) both as a subscriber and a publisher.

Figure 8:
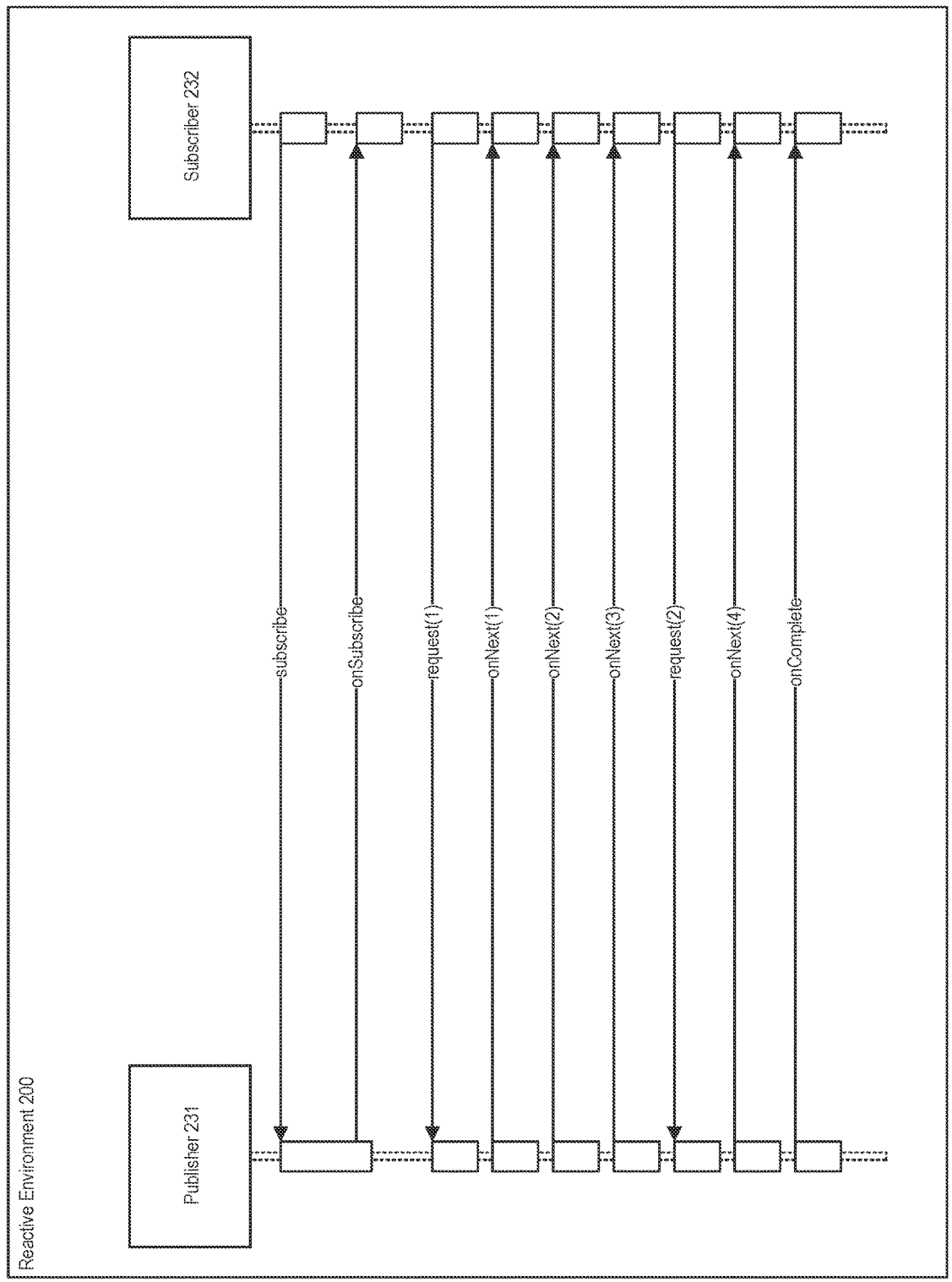
FIG. 8 further illustrates the use of a reactive environment, in accordance with an embodiment.

FIG. 8 further illustrates the use of a reactive environment, in accordance with an embodiment.

As illustrated in FIG. 8, in accordance with an embodiment, when a subscriber is passed to a publisher, the subscriber receives a call on method onSubscribe(Subscription), but will not immediately begin to receive data items or other events. Data items are only received by the subscriber when it calls method request(long) within its subscription, which signals to the publisher a demand for more data.

In accordance with an embodiment, a subscriber can receive data through invocation of a method Subscriber.onNext, which is invoked with the next item, and can be called a number (n) times as determined by a long value passed on the method request(long) of its subscription. A method Subscriber.onError( ) can be invoked when an error occurs while processing the stream. A method Subscriber.onComplete( ) can be invoked when there is no further data to be processed. In the case of both an onError( ) and onComplete( ) event being invoked, then no new data will be emitted by the publisher, even if the method request(long) is called again.

Efficient Reactive Flattening Map

In accordance with an embodiment, a microservices or other computing environment can include the use of a reactive flattening map. In a cloud computing environment, reactive programming can be used with publishers and subscribers, to abstract execution away from the thread of execution while providing rigorous coordination of various state transitions. The described approach provides support for processing streams of data involving one or more publishers and subscribers, by use of a multi-flat-map publisher component, to flatten or otherwise combine events emitted by multiple publishers concurrently, into a single stream of events for use by a downstream subscriber.

In accordance with an embodiment, technical advantages of the described approach include, for example: multiple total orders of events from multiple concurrent publishers joined into one total order of events in the presence of concurrent errors and cancellation; existence of a fast path; organization of concurrent events into a queue of queues, and prefetch to make progress efficiently; conditions for entering the fast path; management of resources and state of multiple concurrent subscriptions, and, based on the specifics of the problem, the type of queues used to capture the state.

FIGS. 9-13 illustrate a multi-flat-map publisher for use with a microservices or other computing environment, in accordance with an embodiment.

Figure 9:
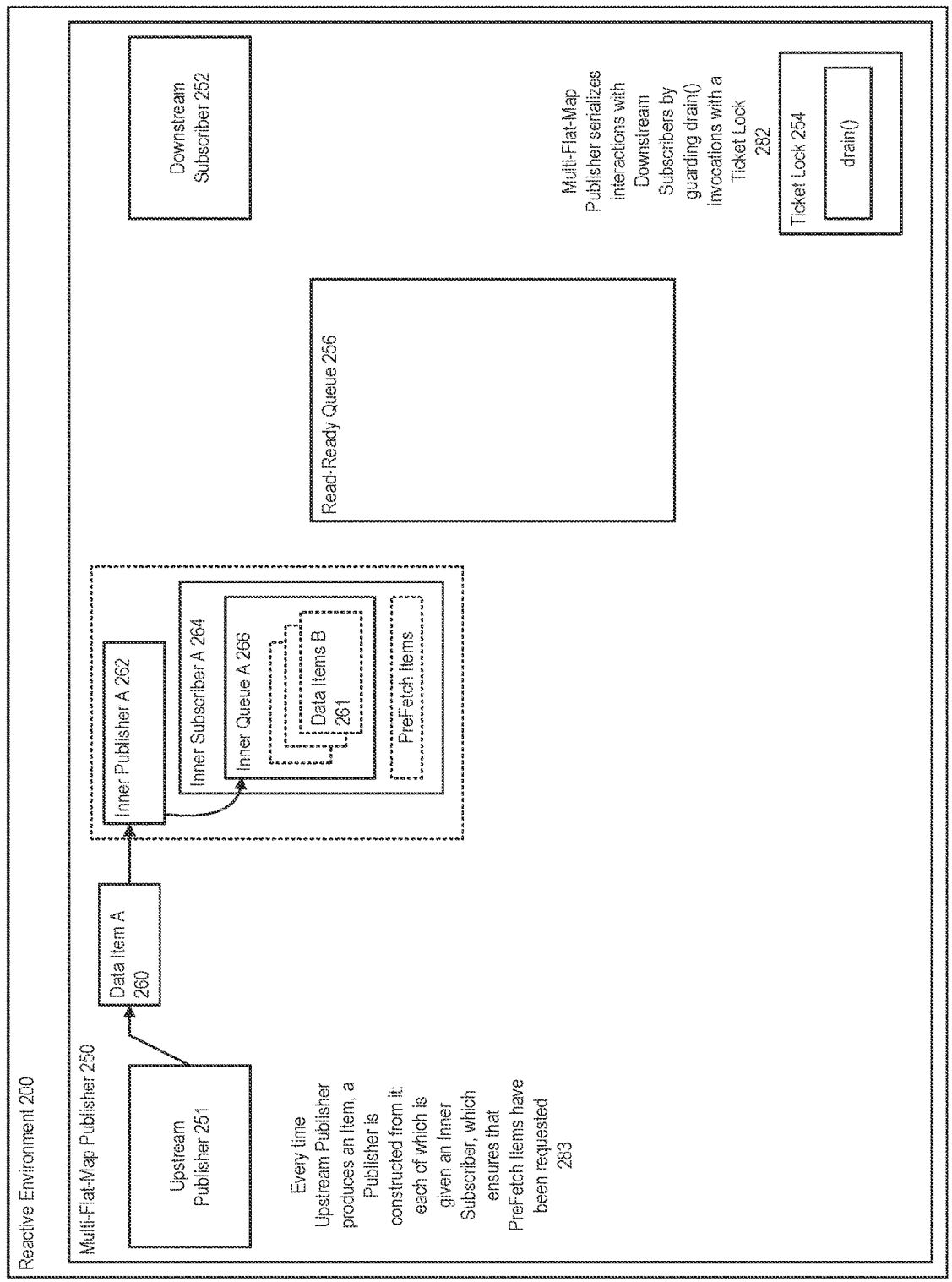
FIG. 9 illustrates a multi-flat-map publisher for use with a microservices or other computing environment, in accordance with an embodiment.

As illustrated in FIG. 9, in accordance with various embodiments, the system includes or operates a multi-flat-map publisher component or process 250 (referred to herein in some examples as a MultiFlatMapPublisher) which concurrently flattens or otherwise combines events, e.g., data items A 260, A' 270, emitted by an upstream publisher (Publisher) 251 via a plurality of inner publishers A 262, B 272, into a single stream of events for use by a downstream subscriber (Subscriber) 252.

In accordance with an embodiment, the multi-flat-map publisher operates as one or more inner publishers to efficiently drain the upstream publisher to produce a stream of items, constructed from each item produced by upstream, and to flatten the "stream of streams" of items (e.g., as [A]→[[B]]→[B] such that a stream of data items A are converted to a stream of streams of B's, which is subsequently flattened to a single stream of B's). The multi-flat-map publisher assumes each inner publisher is allowed to make progress independently of the others, so the order of items produced is partial; only the order of items produced by one inner publisher is preserved.

In accordance with an embodiment, at 282, the multi-flat-map publisher serializes all interactions with the downstream subscriber, by guarding drain (drain( )) invocations with a ticket lock 254, which operates as an atomic counter that counts how many contenders passed by. Since concurrent state changes generally end up attempting to invoke drain( ), the use of the ticket lock ensures that all concurrent changes are observed, and an appropriate signal is sent downstream. Since state information can be kept as non-thread-safe structures, correctness guarantees and resource management can be provided by observing drain( ).

In accordance with an embodiment, at 283, every time the upstream publisher produces a data item, an inner publisher is constructed from the item. Each of these publishers is given an inner subscriber 264, 274, which ensures that any prefetch items have been requested. This helps reduce the cost of requesting items from upstream, and the latency in waiting for items is reduced.

In accordance with an embodiment, using the described approach, an upstream Publisher (251) can produce data items from which multiple inner Publishers (262, 272) can be constructed sequentially. The multiple Publishers can produce items independently of each other. The items produced by the multiple Publishers operating independently are subsequently compiled or flattened into a single stream of data items as observed by the downstream Subscriber (252).

Figure 10:
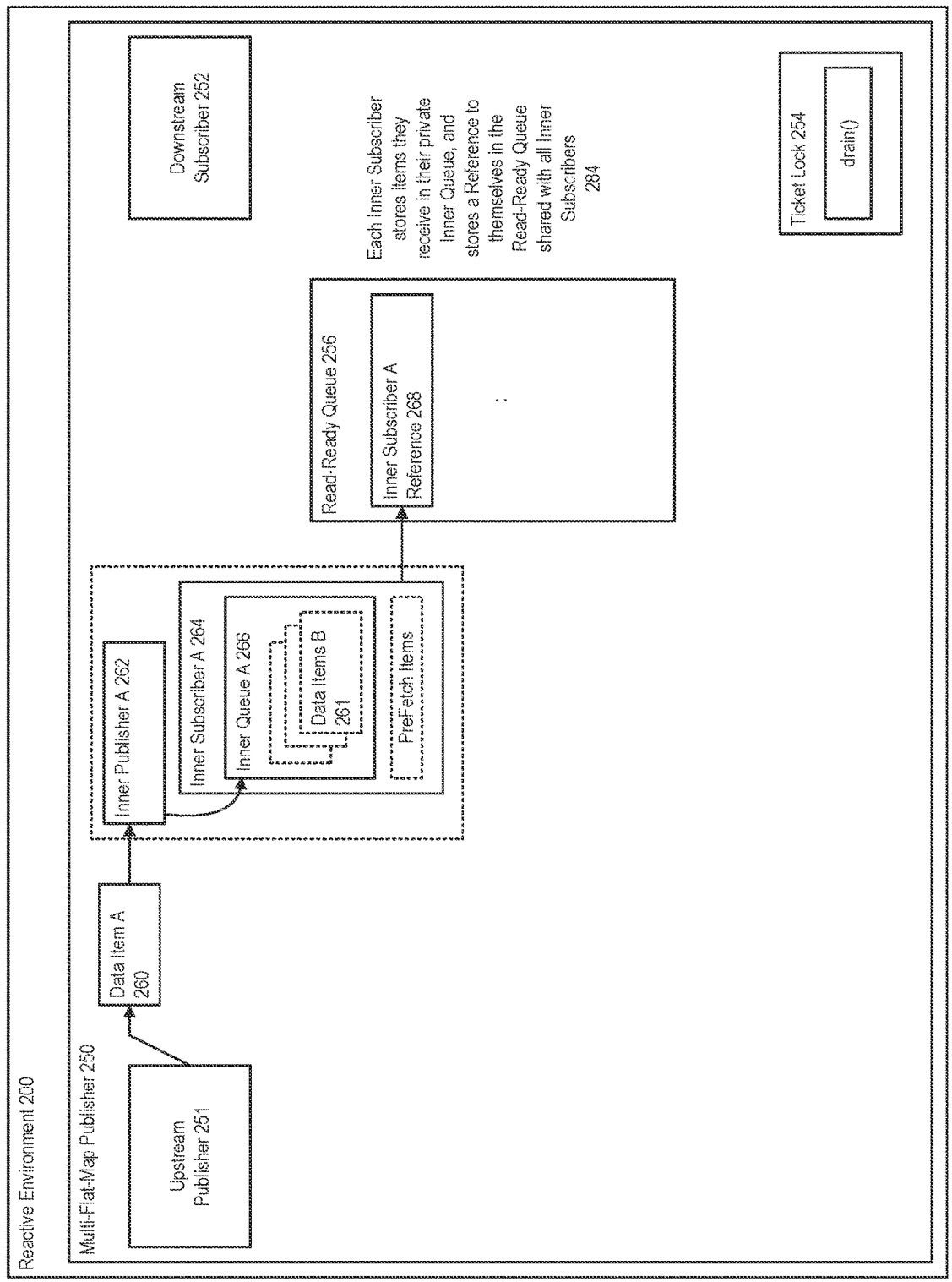
FIG. 10 further illustrates a multi-flat-map publisher for use with a microservices or other computing environment, in accordance with an embodiment.
Figure 11:
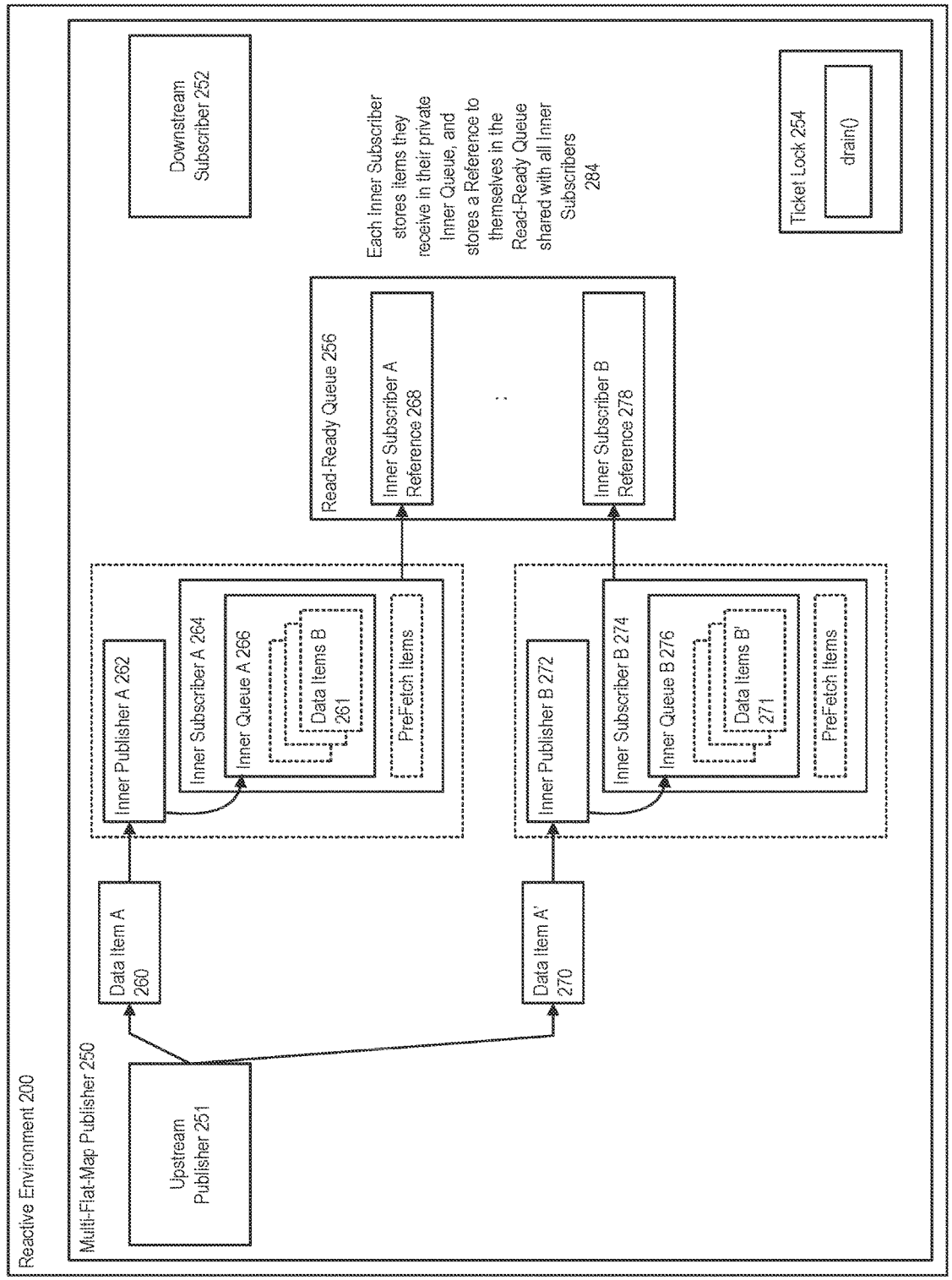
FIG. 11 further illustrates a multi-flat-map publisher for use with a microservices or other computing environment, in accordance with an embodiment.

As illustrated in FIGS. 10-11, in accordance with an embodiment, at 284, the inner subscribers store the items they receive in a private inner queue 266, 276, (e.g., as a stream of items B 261, B' 271); and store a reference 268, 278 to themselves in a read-ready queue 256 (referred to herein in some examples as readReady) that is shared with all inner subscribers.

Figure 12:
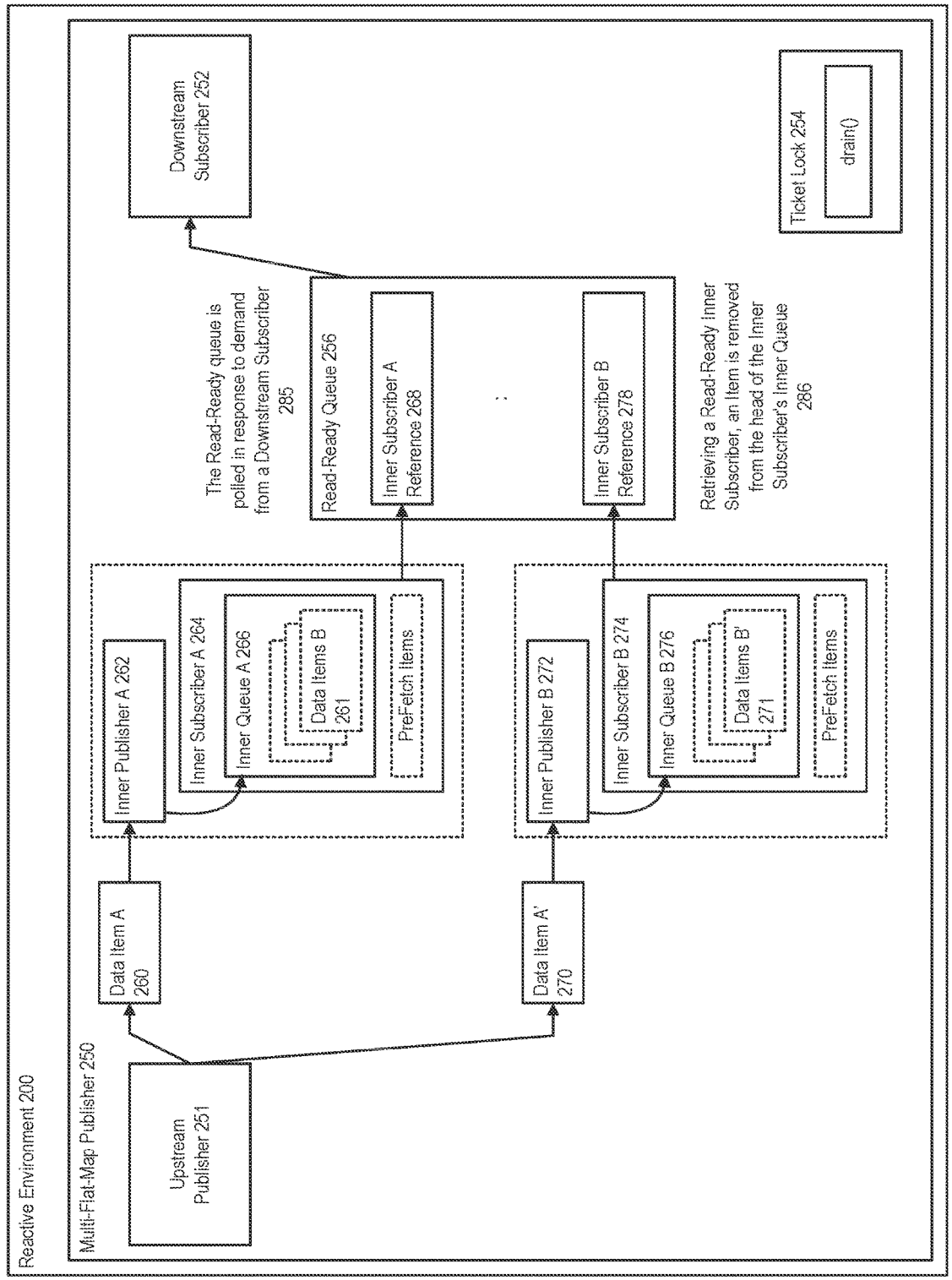
FIG. 12 further illustrates a multi-flat-map publisher for use with a microservices or other computing environment, in accordance with an embodiment.

As illustrated in FIG. 12, in accordance with an embodiment, at 285, the read-ready queue is polled in response to demand from the downstream subscriber. At 286, in retrieving a read-ready inner subscriber, an item is removed from the head of that inner subscriber's inner queue.

Figure 13:
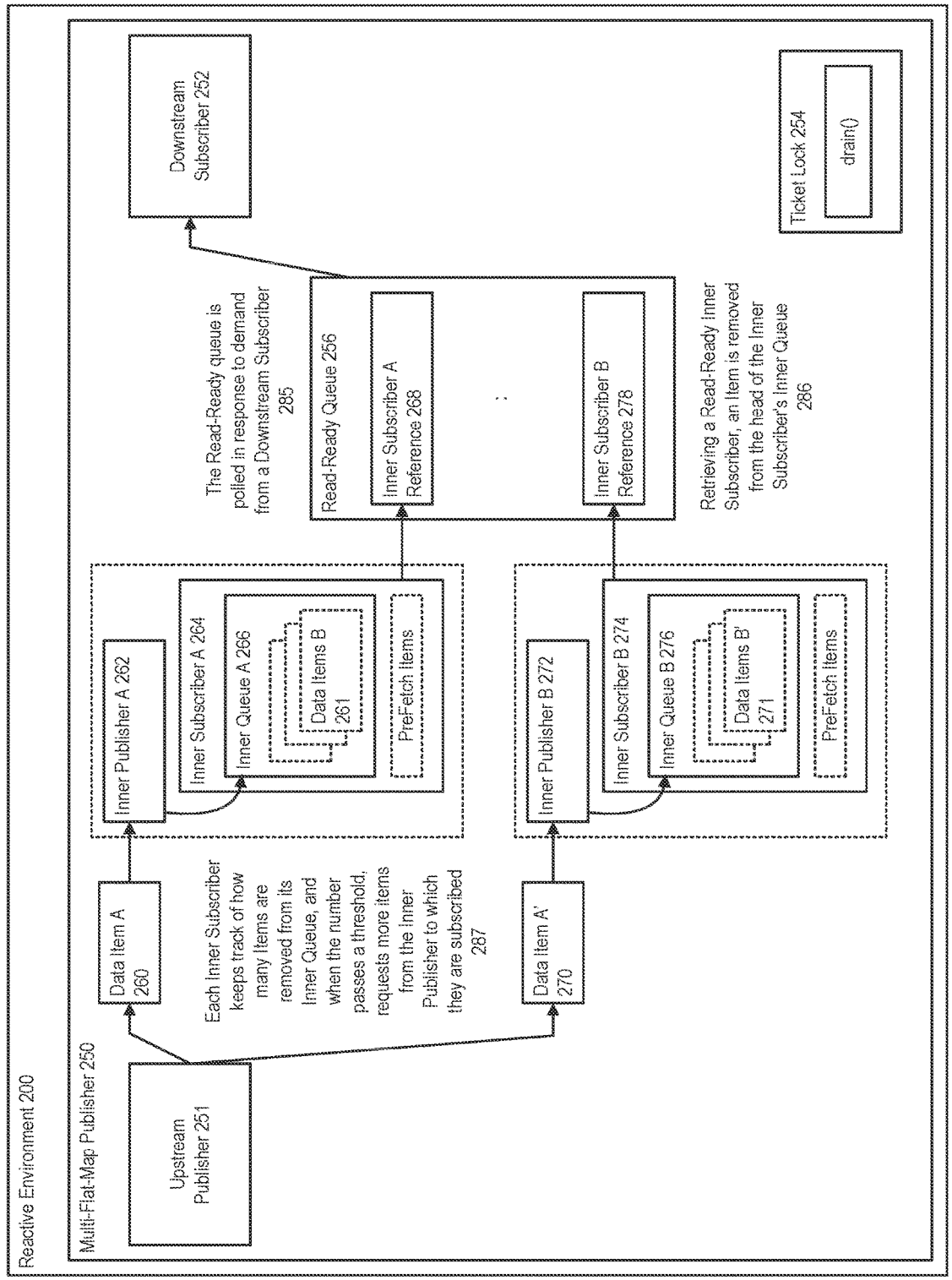
FIG. 13 further illustrates a multi-flat-map publisher for use with a microservices or other computing environment, in accordance with an embodiment.

As illustrated in FIG. 13, in accordance with an embodiment, at 287, at the same time, the inner subscriber keeps track of how many items are removed from its inner queue, and, when the number passes a particular threshold, requests more items from the inner publisher to which they are subscribed. When an inner subscriber enters a terminal state, a new item is requested from upstream publisher (e.g., upstream Publisher 251), in order to maintain the same concurrency level.

In accordance with an embodiment, if the multi-flat-map publisher is configured to signal errors lazily, then an error (onError) is signalled to the downstream subscriber only after all the inner subscribers entered a terminal state.

In accordance with an embodiment, if the multi-flat-map publisher is configured to signal errors eagerly, then all of the items the inner subscribers may be holding in their inner queues are discarded, and an onError signal is delivered to downstream immediately.

This behavior ensures that, during cleanup of the inner queues, or after onError is delivered, no items from inner queues, or any items received from future onNext from an inner publisher will be delivered to downstream, as that would be observed as an out-of-order signal against the specification of the publisher.

In accordance with an embodiment, if the downstream subscriber requests cancellation of its subscription, then the multi-flat-map publisher eventually stops producing any signals, and requests all inner subscribers to eventually stop producing any signals in their turn. The resources retained by the inner subscribers are discarded. The cancellation behavior can be implemented through a mechanism similar to eager error delivery, with the difference being that no onError signal is delivered.

drain( )

In accordance with an embodiment, the system can include a drain( ) function or component that assumes the caller acquired a ticket lock. The main function of drain( ) is to re-examine the state for as long as concurrent contenders are observed. A loop is constructed, which assumes there is only one thread that reached the ticket lock, and after every iteration an atomic update to the contender counter is performed, subtracting the number of contenders seen at the start of the last iteration.

If such subtraction results in a 0, this means no new contenders passed through the ticket lock during the iteration, and any state changes that were not observed by the last iteration will be observed in a future iteration—due to the obligation to attempt entering drain( ) after any such state change. The changes that result in such an attempt are: a change to cancelPending; a captured eager error delivery by any of the Publisher and downstream Subscriber cancellations; a change to the readReady queue; a change to demand from downstream Subscriber; or the MultiFlatMapPublisher becoming quiescent.

In accordance with an embodiment, the state transition operates as follows:

While there is no request to stop producing onNext, the readReady queue is not empty and the demand of the downstream Subscriber is not satisfied, an item is retrieved from the head of the inner queue of the first read-ready inner Subscriber, and delivered to downstream. Once cancelPending is observed, the onNext invocation is unreachable.

If that loop stopped because of cancelPending, then cleanup—release the resources pinned by readReady queue and any active inner Subscriber, signal Subscription cancellation, unless upstream is known to be quiescent, and signal Subscription cancellation of any active inner Subscriber. This may happen concurrently with a new inner Subscriber being created, so they should ensure that either a reference to them can be observed by the cleanup routine, or that they perform the cleanup and Subscription cancellation themselves.

If eager error notification is required, or all Publishers are quiescent and no more items in readReady queue, then downstream Subscriber is notified. After this MultiFlatMapPublisher appears as cancelled, so onError and onComplete are no longer reachable. This may happen concurrently with inner Subscribers attempting the delivery of new items, so the cleanup routine remains reachable: any items added to readReady queue by such concurrent invocations will be removed by, or on behalf of, such inner Subscribers.

Detection of Quiescence

In accordance with an embodiment, the system must detect quiescence to ensure the correct order of termination signals with respect to the other signals. This is achieved through tracking the number of Publisher that may yet deliver any signals, including upstream. Only when all Publisher have reached a terminal state, and the error signalling is delivered lazily, will onError or onComplete be delivered. Initially, an awaitingTermination atomic counter is advanced from 0 to 1 to account for the upstream Publisher. Then, every time an onNext is received from upstream, the atomic counter is incremented; and when a termination signal is received from either upstream or any inner Publisher, it is decremented. The upstream signalling a terminal state decrements the counter by adding (−1) mod 2^31, or MAX_VALUE. Adding such a number to a 32-bit quantity that is necessarily positive results in a negative number. This aids subscription management, and helps detect when requesting or cancelling items from upstream is futile.

Subscription Management

In accordance with an embodiment, the MultiFlatMapPublisher uses a flat-map subscriber (FlatMapSubscriber) to manage state. FlatMapSubscriber is allowed to be used only once, so it ensures onSubscribe is invoked successfully once (and only once). This is achieved by tracking the value of awaitingTermination counter: a subscription is accepted only if awaitingTermination atomic counter is zero and can be atomically advanced from 0 to 1. If this fails, then there is a Subscription that has been accepted, and the onSubscribe call fails. Additionally, the awaitingTermination counter actually never becomes 0 throughout its lifetime, so the above process ensures that one (and only one) Subscription is accepted. To achieve this, the most significant bit is set to 1 when the upstream Publisher produces a terminal signal, so the MultiFlatMapPublisher is quiescent no earlier than when the value of awaitingTermination is MIN_VALUE. Observing a negative value of awaitingTermination indicates a condition when upstream has reached its terminal state.

In accordance with an embodiment, a downstream Subscription is performed once (and only once), when upstream Subscription is accepted. The onSubscribe signal is mutually excluded from other downstream signals, because they cannot occur before any Publisher has been produced from items received from upstream. This does not happen until a request is invoked on upstream Subscription, which is performed after downstream onSubscribe is completed.

Cancellation and Error Notification

In accordance with an embodiment, a downstream Subscriber may cancel their Subscription at any time, and concurrently. Errors may also occur concurrently—in particular, when an invalid request is made by the downstream Subscriber. These two conditions are tracked similarly—the only observable difference is whether canceled flag is set, and if lazy error notification is configured, then the error is not observed until MultiFlatMapPublisher is quiescent. If canceled is observed as set by drain( ), the state of MultiFlatMapPublisher is assumed cancelled, and the error is ignored, even if it occurred.

In accordance with an embodiment, cancellation operates to: notify upstream that no more signals are required of it; notify all inner Subscribers that no more signals are required of the; and release any resources.

In accordance with an embodiment, in order to be able to notify the inner Subscribers, FlatMapSubscriber keeps track of all current inner Subscribers in the Subscribers Set. Because cancellation can be concurrent with any other event, it is necessary that the inner Subscribers verify that their presence in the Subscribers Set can be observed: if cancelPending is observed to be false after adding the inner Subscriber to the Set, then it is guaranteed that the cleanup is in the future; otherwise the inner Subscriber should perform cleanup of its Subscription and resources. Consequently, it is sufficient to perform this check once in onSubscribe( ) of the inner Subscriber.

In accordance with an embodiment, inner Subscribers remove themselves from the Subscribers Set upon reaching a terminal state, because no more interactions with inner Subscription is necessary, and the only references to such Subscribers can be found in the readReady queue. Effectively, such Subscribers do not observe any cancellation, and the cleanup of the resources consumed by them amounts to dropping all the references from the readReady queue during cleanup.

Resource Management

The reactive nature of interactions with MultiFlatMapPublisher requires it to retain a bounded amount of resources in the presence of Publishers conforming to the reactive specification. There is also an obligation to retain the resources for as short a period of time as necessary, in the presence of non-conforming Subscribers or malformed pipelines that may retain references to MultiFlatMapPublisher indefinitely. These challenges require keeping track of demand from downstream Subscriber, and ensure the upstream and the inner Publishers cause retention of a bounded number of items. More items are requested from upstream only after the last item has been consumed from the queue of an inner Subscriber—this ensures no more than maxConcurrency*prefetchitems are retained by all inner Subscribers.

In accordance with an embodiment, the system can ensure that cleanup( ) remains always reachable, even after a terminal state has been entered, in case there are concurrent inner Subscribers that did not observe cancellation or eager error delivery before enqueuing more items. Besides, inner Publishers are not obliged to observe cancellation immediately, and may produce more items for an unspecified amount of time (there is only a requirement for them to stop producing items eventually).

Detecting the Last Item in the Queue Condition

In accordance with an embodiment, the inner Subscribers add themselves to the readReady queue for every item they are ready to produce. Additionally, they add themselves once to the readReady queue, when they reach a terminal state. The drain( ) loop will eventually observe such an inner Subscriber at the head of the readReady queue, but observe their inner queue empty. This will be treated by drain( ) loop as an indication that the last item has been consumed from the inner Subscriber, and a request for more items from upstream is performed, to effectively replace the Publisher that has just finished with a new inner Publisher.

In particular, the order of check whether readReady queue is empty before checking the demand from the downstream Subscriber ensures that this condition is observed, and the demand from upstream is signalled, without the downstream Subscriber signalling any demand.

empty( )

In accordance with an embodiment, an empty( ) check removes the head of the readReady queue for as long as there is any inner Subscriber there, whose inner queue is empty. Then it requests as many items from upstream as there were such inner Subscribers discovered at the head of the readReady queue. Additionally, after such an operation readReady queue is either empty, or contains an inner Subscriber with non-empty inner queue at the head.

Fast Path

In accordance with an embodiment, there are use cases where a significant performance gain can be obtained by eliminating the interactions with readReady queue, for example: sequential flattening of all inner Publishers (e.g. maxConcurrency=1); coordinated concurrent inner Publishers: several inner Publishers are producing items in some total order, established by out of band means.

If the downstream Subscriber is faster than Publishers in these cases, or are able to consume multiple items at the same time, readReady queue may appear empty most of the time. In this case the Publishers often add the first item to the readReady queue, and the items that it should appear after in the partial order of all items, have all been consumed. It is possible to deliver such an item to downstream Subscriber directly, avoiding readReady queue, as long as total order of all signals to downstream Subscriber is preserved.

In accordance with an embodiment, inner Subscriber onNext, onError and onComplete try to obtain the ticket lock (attempt to atomically update contender counter from 0 to 1), and, if successful, verify the same conditions as drain( ) would: if cancelPending, or readReady queue is not empty, or insufficient demand from downstream Subscriber, fall back to the slow path, enqueuing the item in the inner queue, enqueuing self with the readReady queue, and invoking drain( ); otherwise, it is safe to assume exclusive access to the state of FlatMapSubscriber and serialized signals to downstream, and eventually enter drain( ) to observe if any other state changes occurred concurrently.

In accordance with an embodiment, an onError and onComplete can verify a weaker condition: that the inner queue is empty, not readReady queue: these signals do not result in any signals to downstream, so they do not need to be ordered with respect to signals on behalf of any readready inner Subscribers already in the queue.

Read-Ready Queue

In accordance with an embodiment, most of the readReady queue and inner queues of the inner Subscribers are accessed single-threadedly:

A put( ) to readReady queue can be performed concurrently by any inner Subscriber.

A put( ) to the inner queue can be performed by the inner Subscriber, and only single-threadedly; which can be guaranteed by a total order of events signalled by inner Publisher.

A peek( ), empty( ), clear( ) of readReady queue are invoked single-threadedly; by the owner of the ticket lock.

A peek( ), poll( ), empty( ), clear( ) of the inner queues of the inner Subscribers are invoked single-threadedly; by the owner of the ticket lock.

In accordance with an embodiment the poll( ) of the inner queues of the inner Subscribers is not reachable, unless the Subscriber is discovered at the head of the readReady queue. Despite seemingly concurrent accesses to the head and the tail of the inner queues by the inner Subscribers and drain( ), drain( ) is not attempting to access the part of the queue beyond the tail element of the queue as could be observed before readReady.put( ).

In accordance with an embodiment, there can be invocations of clear( ) for the inner queues concurrent with put( ), performed to clear the resources upon cancellation or eager error delivery. Since clear( ) may not observe the tail of the queue has been updated, an additional method can be provided to clearTail( ), to be performed by inner Subscriber, when they observe a concurrent clear( ) may exist.

put( )

In accordance with an embodiment put( ) operates like ConcurrentLinkedQueue—to be used by inner Subscribers adding themselves to readReady queue.

poll( ), peek( ), empty( ) and clear( )

In accordance with an embodiment, these functions are guaranteed to be safe in the absence of:

Concurrent poll( ) and peek( ).

Read and update head using non-serialized loads and stores (non-volatile reads and writes).

Modification of head.tail in clear( ) may make tail.v not visible to poll( ), peek( ) and clear( ) in the presence of concurrent put( ) or putNotSafe( ). The inner Subscriber adding an item in the presence of clear( ) should ensure the reference is dropped, since the Subscriber may not be reachable through readReady. The cleanup is still needed, as the reference to the inner Subscriber escapes through inner Publisher.subscribe, and should be assumed reachable indefinitely. The inner Subscriber adding an item to readReady queue will enter drain( ), observe cancelPending and invoke readReady.clear( ) again, updating head and dropping the reference putNotSafe( )

In accordance with an embodiment, this function guarantees to be safe in the absence of concurrent put( ) and other putNotSafe( ) invocations. Initialize queue node and update tail pointer using non-serialized stores (non-volatile writes).

clearTail( )

In accordance with an embodiment, ensures the reference to the last item in the queue is dropped. This may retain a reference to the queue Node, but the footprint remains constant (has a constant upper bound).

Figure 14:
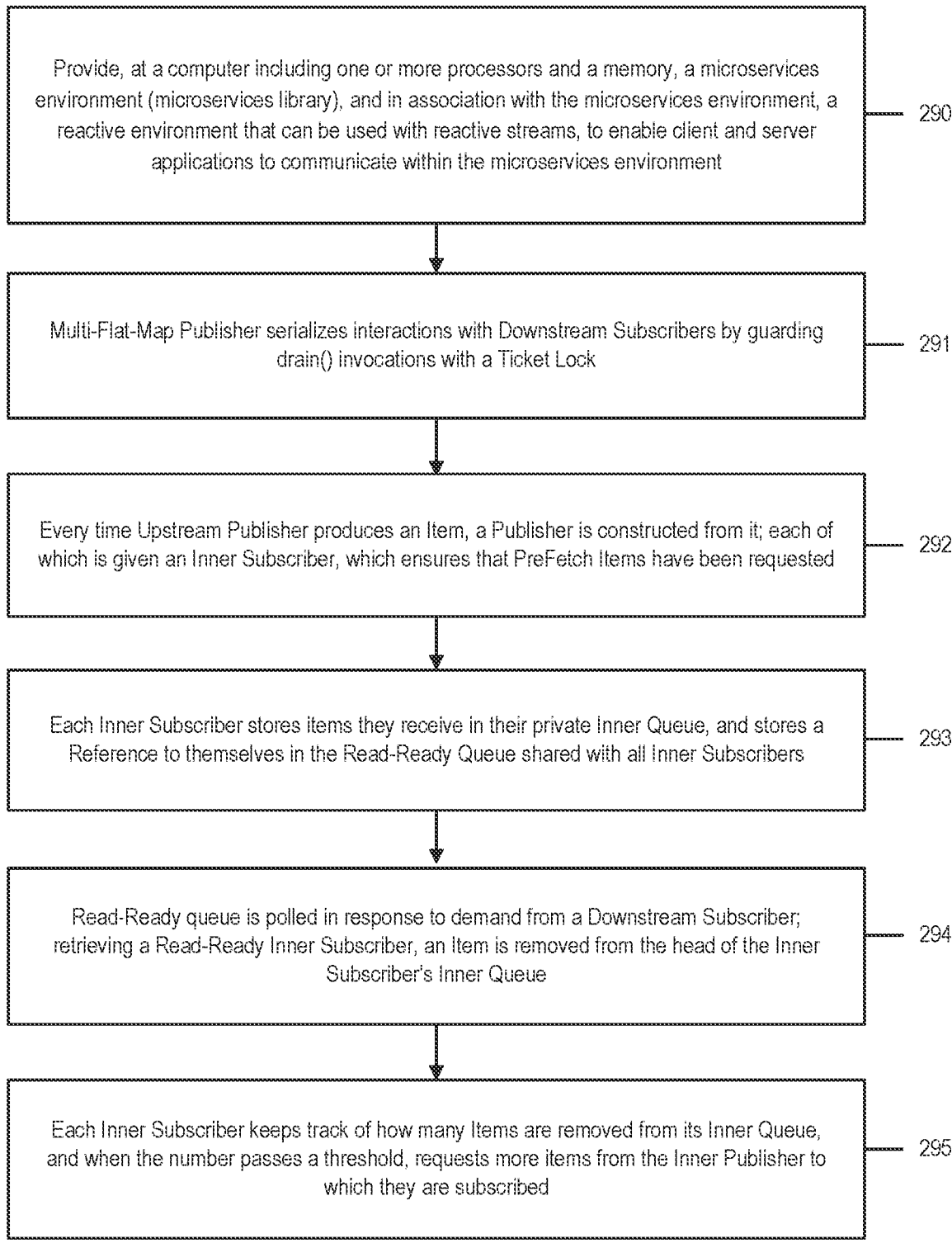
FIG. 14 illustrates a process or method for providing a multi-flat-map publisher for use with a microservices or other computing environment, in accordance with an embodiment.

FIG. 14 illustrates a process or method for providing a multi-flat-map publisher for use with a microservices or other computing environment, in accordance with an embodiment.

As illustrated in FIG. 14, in accordance with various embodiments, the method can include, at step 290, providing, at a computer including one or more processors and a memory, a microservices environment (microservices library), and in association with the microservices environment, a reactive environment that can be used with reactive streams, to enable client and server applications to communicate within the microservices environment.

At step 291, a multi-flat-map publisher serializes interactions with downstream subscribers by guarding drain( ) invocations with a ticket lock.

At step 292, every time an upstream publisher produces an item, a publisher is constructed from it; each of which is given an inner subscriber, which ensures that prefetch items have been requested.

At step 293, each inner subscriber stores items they receive in their private inner queue, and stores a reference to themselves in a read-ready queue shared with all inner subscribers.

At step 294, the read-ready queue is polled in response to demand from a downstream subscriber; retrieving a read-ready inner subscriber, an item is removed from the head of the inner subscriber's inner queue.

At step 295, each inner subscriber keeps track of how many items are removed from its inner queue, and when the number passes a threshold, requests more items from the inner publisher to which they are subscribed.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservices environment, various embodiments can be used with other types of microservice environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for reactive flattening map for use with a microservices or other computing environment, comprising:
    a computer including one or more processors, that provides access to a microservices or other computing environment, for use with software applications;
    wherein the system supports processing of streams involving one or more publishers and subscribers, wherein a publisher publishes a stream of data, and a subscriber consumes the data; and
    wherein a multi-flat-map publisher component operates as a publisher that drains an upstream publisher to produce a stream of items from publisher constructed from each item produced by upstream; and operates to flatten a stream of streams of items, for use by the system; and
    wherein the multi-flat-map publisher serializes interactions with downstream subscribers by guarding drain invocations with a ticket lock.

2. The system of claim 1, wherein:
    every time an upstream publisher produces an item, a publisher is constructed from it; each of which is given an inner subscriber, which ensures that prefetch items have been requested.

3. The system of claim 1, wherein:
    each inner subscriber stores items they receive in their private inner queue, and stores a reference to themselves in a read-ready queue shared with all inner subscribers;
    the read-ready queue is polled in response to demand from a downstream subscriber; retrieving a read-ready inner subscriber, an item is removed from the head of the inner subscriber's inner queue.

4. The system of claim 1, wherein:
each inner subscriber keeps track of how many items are removed from its inner queue, and when the number passes a threshold, requests more items from the inner publisher to which they are subscribed.

5. The system of claim 1, wherein:
every time an upstream publisher produces an item, a publisher is constructed from it; each of which is given an inner subscriber, which ensures that prefetch items have been requested;
each inner subscriber stores items they receive in their private inner queue, and stores a reference to themselves in a read-ready queue shared with all inner subscribers;
the read-ready queue is polled in response to demand from a downstream subscriber; retrieving a read-ready inner subscriber, an item is removed from the head of the inner subscriber's inner queue; and
each inner subscriber keeps track of how many items are removed from its inner queue, and when the number passes a threshold, requests more items from the inner publisher to which they are subscribed.

6. The system of claim 1, wherein the microservices or other computing environment is provided within a cloud computing environment that provides access to cloud, database, or other systems or services.

7. A method for providing a reactive flattening map for use with a microservices or other computing environment, comprising:
providing, at a computer including one or more processors, a microservices or other computing environment, for use with software applications;
processing streams involving one or more publishers and subscribers, wherein a publisher publishes a stream of data, and a subscriber consumes the data; and
providing a multi-flat-map publisher component that operates as a publisher that drains an upstream publisher to produce a stream of items from publisher constructed from each item produced by upstream; and operates to flatten a stream of streams of items;
wherein the multi-flat-map publisher serializes interactions with downstream subscribers by guarding drain invocations with a ticket lock.

8. The method of claim 7, wherein:
every time an upstream publisher produces an item, a publisher is constructed from it; each of which is given an inner subscriber, which ensures that prefetch items have been requested.

9. The method of claim 7, wherein:
each inner subscriber stores items they receive in their private inner queue, and stores a reference to themselves in a read-ready queue shared with all inner subscribers;
the read-ready queue is polled in response to demand from a downstream subscriber; retrieving a read-ready inner subscriber, an item is removed from the head of the inner subscriber's inner queue.

10. The method of claim 7, wherein:
each inner subscriber keeps track of how many items are removed from its inner queue, and when the number passes a threshold, requests more items from the inner publisher to which they are subscribed.

11. The method of claim 7, wherein:
every time an upstream publisher produces an item, a publisher is constructed from it; each of which is given an inner subscriber, which ensures that prefetch items have been requested;
each inner subscriber stores items they receive in their private inner queue, and stores a reference to themselves in a read-ready queue shared with all inner subscribers;
the read-ready queue is polled in response to demand from a downstream subscriber; retrieving a read-ready inner subscriber, an item is removed from the head of the inner subscriber's inner queue; and
each inner subscriber keeps track of how many items are removed from its inner queue, and when the number passes a threshold, requests more items from the inner publisher to which they are subscribed.

12. The method of claim 7, wherein the microservices or other computing environment is provided within a cloud computing environment that provides access to cloud, database, or other systems or services.

13. A non-transitory computer readable storage medium, including instructions stored thereon which when read and executed by one or more computers cause the one or more computers to perform the steps comprising:
provide a microservices or other computing environment, for use with software applications;
process streams involving one or more publishers and subscribers, wherein a publisher publishes a stream of data, and a subscriber consumes the data; and
provide a multi-flat-map publisher component that operates as a publisher that drains an upstream publisher to produce a stream of items from publisher constructed from each item produced by upstream; and operates to flatten a stream of streams of items; and
wherein the multi-flat-map publisher serializes interactions with downstream subscribers by guarding drain invocations with a ticket lock.

14. The non-transitory computer readable storage medium of claim 13, wherein:
each inner subscriber stores items they receive in their private inner queue, and stores a reference to themselves in a read-ready queue shared with all inner subscribers;
the read-ready queue is polled in response to demand from a downstream subscriber; retrieving a read-ready inner subscriber, an item is removed from the head of the inner subscriber's inner queue.

15. The non-transitory computer readable storage medium of claim 13, wherein:
each inner subscriber keeps track of how many items are removed from its inner queue, and when the number passes a threshold, requests more items from the inner publisher to which they are subscribed.

16. The non-transitory computer readable storage medium of claim 13, wherein:
every time an upstream publisher produces an item, a publisher is constructed from it; each of which is given an inner subscriber, which ensures that prefetch items have been requested;
each inner subscriber stores items they receive in their private inner queue, and stores a reference to themselves in a read-ready queue shared with all inner subscribers;
the read-ready queue is polled in response to demand from a downstream subscriber; retrieving a read-ready inner subscriber, an item is removed from the head of the inner subscriber's inner queue; and
each inner subscriber keeps track of how many items are removed from its inner queue, and when the number passes a threshold, requests more items from the inner publisher to which they are subscribed.

17. The non-transitory computer readable storage medium of claim 13, wherein the microservices or other computing environment is provided within a cloud computing environment that provides access to cloud, database, or other systems or services.

\* \* \* \* \*